United States Patent [19]

Schmidt

[11] Patent Number: 4,640,620
[45] Date of Patent: Feb. 3, 1987

[54] ARRANGEMENT FOR RAPID DEPTH MEASUREMENT USING LENS FOCUSING

[75] Inventor: Richard Schmidt, Huntington, N.Y.

[73] Assignee: Robotic Vision Systems, Inc., Hauppauge, N.Y.

[21] Appl. No.: 566,688

[22] Filed: Dec. 29, 1983

[51] Int. Cl.⁴ .............................................. G01B 11/24
[52] U.S. Cl. .................................................... 356/376
[58] Field of Search ....................... 356/375, 376, 127; 350/162.12, 163.13; 250/201 AF

[56] References Cited

U.S. PATENT DOCUMENTS

| | | | |
|---|---|---|---|
| 3,481,672 | 12/1969 | Zoot | 356/375 |
| 3,666,359 | 5/1972 | Lee | 350/162.13 |
| 4,153,834 | 5/1979 | Hayamizu | 250/201 |
| 4,156,558 | 5/1979 | Grumet | 350/342 |
| 4,209,252 | 6/1980 | Arditty et al. | 356/127 |
| 4,320,462 | 3/1982 | Lund et al. | 356/121 |
| 4,360,269 | 11/1982 | Iwamoto et al. | 350/162.12 |
| 4,435,079 | 3/1984 | Hennick | 250/201 |
| 4,461,541 | 6/1984 | Duthie | 350/162.12 |

Primary Examiner—R. A. Rosenberger
Attorney, Agent, or Firm—Max Fogiel

[57] ABSTRACT

A pattern of light is projected upon a surface to be measured which may be devoid of surface detail. A sharply focused image of the surface provides distance discrimination. Although the projected pattern may be separate from the imaging optics, a common optics path removes distortion, provides maximum sensitivity and eliminates processing for misalignment between projector and imager. Parallel detection of regions within the image receiving light intensities above a threshold enables rapid availability of measurements. Optical cross-correlation and Fourier transform processing methods may be employed to enhance image processing with no processing delay. Three-dimensional co-ordinate measurements relative to the sensor are reported for all in-focus regions of the image. Refocusing the lens provides depth coverage.

6 Claims, 2 Drawing Figures

ARRANGEMENT FOR RAPID DEPTH MEASUREMENT USING LENS FOCUSING

BACKGROUND OF THE INVENTION

In any camera system, range to the object may be approximated for objects closer than the hyperfocal distance by observing the sharpness of focus of the image of the object (or a portion thereof) as the camera lens is moved or indexed across its focusing range. At the position of sharpest focus the range of the object (or portion thereof) may be read directly from a calibrated focus adjustment. This can be done whenever there is sufficient detail on the object surface or at its boundary to permit the focusing to be readily apparent to the human eye or to a processor which can determine sharpness of focus based upon fine detail. Sharpness of focus is determined when the spatial high frequency content of a region is maximized or when the percentage modulation at a region is maximized, or both. This can be achieved by many well known digital processing schemes which use the digitized output from a TV camera as input or alternatively, by the use of instantaneous Fourier transform techniques which instantly yield spatial frequency information. However, both techniques fail when the object has insufficient surface detail or its edges are gently curving so as to defy the requirements for the presence of some innate structure upon which to judge proper focusing.

Projecting a pattern with detail on the surface can enable acquiring the desired surface measurements. However, if sequential processing of the image is employed, the time required may be greater than allowable for a particular system function. The present invention proposes to enable rapid image evaluation by parallel detector readout and optical processing.

SUMMARY OF THE INVENTION

It is an object of the present invention to overcome the prior art disadvantages.

More particularly, it is an object of the present invention to measure the distance from a sensor to a surface and provide the three-dimensional co-ordinates of points on the surface relative to the sensor with minimum processing delay.

In keeping with this object, and with still others which will become apparent as the description proceeds, the invention comprises projecting a pattern of light (not necessarily restricted to visible electromagnetic radiation) onto the surface to be measured; receiving the reflected light from the surface through the same lens used for projection; cross-correlating the received image with a reference pattern; imaging the cross-correlation product on an array of detectors; and reporting the co-ordinates, relative to the sensor, associated with each detector sensing a received signal above a threshold.

An alternate method would enhance the system performance by Fourier transform processing of the received image.

The invention will hereafter be described with reference to an exemplary embodiment as illustrated in the drawings. However, it is to be understood that this embodiment is illustrated and described for the purpose of information only, and that nothing therein is to be considered limiting of any aspect of the invention.

DESCRIPTION OF THE PREFERRED EMBODIMENTS

Figure 1:
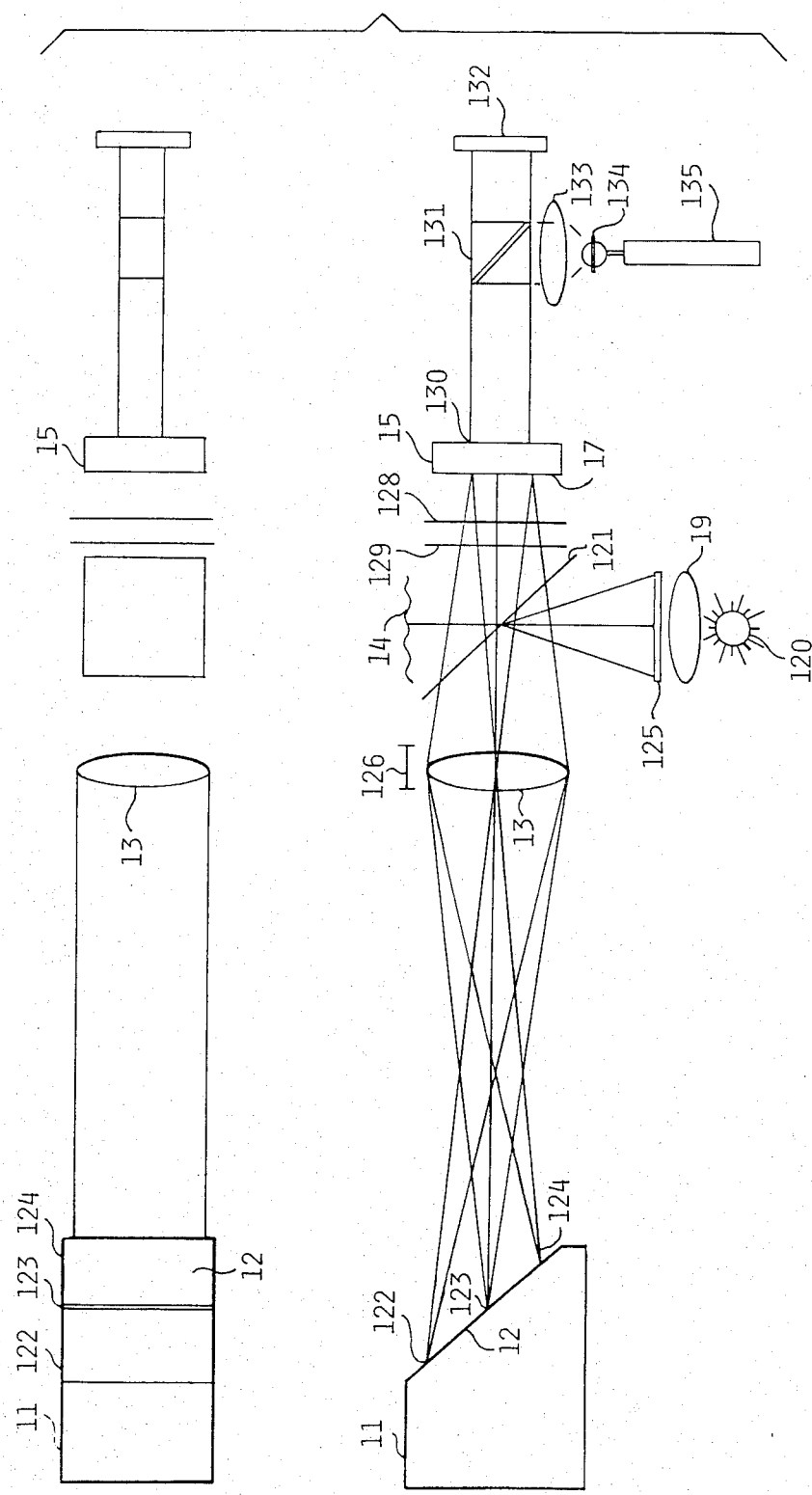
FIG. 1 is an optical schematic of an exemplary embodiment of the invention.

The present invention proposes a solution to the failure of prior art devices to measure distance to objects lacking surface detail with very short processing delay. FIG. 1 shows the addition of optical processing and detector array with individual readouts to the prior art which enables the parallel processing of the received image. In the prior art, particularly when the surfaces to be measured are devoid of surface detail, a pattern 125 containing detail is projected onto a surface 12 to be measured. The pattern 125 to be projected is illuminated by light source 120 with condensing lens 19. Light passing through transparent portions of pattern 125 is partially reflected towards lens 13 by beam splitter 121, the remainder of the light being absorbed by light absorbing surface 14. Lens 13 focuses the image of pattern 125 at a known distance from lens 13. An object 11 at that distance with a sloping surface 12 facing the device will have a sharp image of pattern 125 irradiating its surface at the in-focus distance 123 and blurred images at further distances 122 and nearer distances 124 as illustrated in the Plan View of the system. Reflected light from the pattern projected on surface 12 is then imaged by lens 13 on a light sensitive detector such as a vidicon in the prior art. Vidicon readout and subsequent processing of the prior art progressed serially over the myriad elements of the image, a necessarily time consuming process. In the present invention, the reflected light is imaged onto a liquid crystal light valve (LCLV) 15 which enables parallel processing of the image. Laser light source 135 illuminates spatial filter 134. Recollimating lens 133 forms the reference light pattern which is then redirected towards the output side 130 of LCLV 15 by polarizing beam splitter 131. The reference light pattern is identical to pattern 125. Since lens 13 is common to the projection and imaging paths, the image on the input side 17 of LCLV 15 of projected pattern 125 on any surface at the in-focus distance 123 will be identical to pattern 125 in the region of the image. This is true because the reciprocity property of lens 13 removes any distortion from the reflected pattern light that is introduced during projection. The input side 17 of LCLV 15 must be precisely positioned the same optical distance from beam splitter 121 reflecting surface as is pattern 125 to assure that optimum focus is achieved simultaneously for both the projection and imaging paths. Only lens defects that cause a blurring of the image will introduce deviations from an exact replica of pattern 125 at the image on the input side 17 of LCLV 15. LCLV 15 reflects the reference light pattern from surface 130 with a polarization shift proportional to the amplitude of light received on spatially corresponding points of side 17. The product thus formed passes through polarizing beam splitter 131 that converts the polarization shift to amplitude variations which forms an image on an array of detectors 132. The output of each detector can be compared to a predetermined threshold value to declare the presence or absence of a detected signal. The presence of a signal on a particular detector in array 132 is then indicative of a reflecting surface at a particular location in the field of the sensor at in-focus distance 123. The combination of lens 13 position 126 and detector position in array 132 uniquely defines the three-dimensional co-ordinates of the reflecting surface point as determined at the time of sensor calibration.

Detector array 132 could be placed at location 17 and the LCLV 15 with associated components 131, 133, 134, 135 eliminated. However, the signal enhancement derived from light amplification and cross-correlation by LCLV 15 would be lost.

The projected pattern 125 may consist of any pattern that has mathematical properties providing sufficient detail. Such patterns as dot arrays, horizontal bars, vertical bars, angled bars, concentric circles, etc., may be employed.

Similarly, to avoid the contrast diminishing effects of ambient light when using this process, it is anticipated that light source 120 will be a strobelight or a narrow band illumination device (e.g. a laser) with corresponding bandpass filter 129 in the detection path. A shutter 128 may also be used synchronized with light source 120.

If the illumination pulse of arbitrary length can be sharply terminated and the detector shutter 128 opened several nanoseconds later, the intense reflections internal to the sensor and at distances closer than the object 11 can be eliminated from reaching LCLV 15 and reducing the contrast between bright and dark portions of the image on surface 17.

Figure 2:
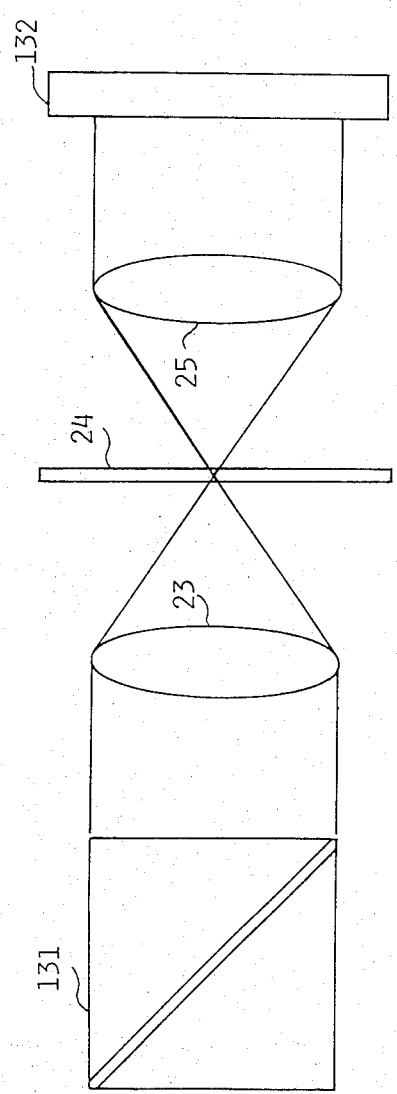
FIG. 2 is an optical schematic of Fourier transform enhancement processing.

Greater enhancement of the desired in-focus parts of the image on surface 17 can be obtained by Fourier processing. By placing Fourier transform lens 23, Fourier transform filter 24 and retransform lens 25, as shown in FIG. 2, between beam splitter 131 and detector array 132, we can enhance signals from in-focus regions since they will contain a high content of the spatial frequencies present in the projected pattern 125. Out of focus regions will lack similar frequency content and hence light from those regions can be blocked by a Fourier transform filter 24 placed in the transform plane. The filter 24 is matched to the expected pattern 125 and passes light from in-focus regions with a minimum of attenuation. Spatial filter 134 is no longer required. Lens 133 now must expand the laser beam to fill the output side 130 of LCLV 15 with collimated light. All other parts and functions of the sensor are unaffected.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method for simultaneously acquiring the three-dimensional co-ordinates relative to a sensor of at least two spatially separated points on a surface that may be devoid of detail, comprising the steps of: projecting a pattern of light with a projector from a light source; imaging reflected light from said pattern with a lens onto a light-sensitive detector array; focusing said image sharply by said lens within a narrow object plane; calibrating the image on said detector array for each unique location of the said sharply focused narrow object plane; storing calibration data from said calibration in a memory; adjusting said object plane focal distance with said lens to intersect the surface of an object to be measured at an intersection; said intersection containing at least two spatially separated points; comparing each measured response to a threshold value; and conveying each response above threshold value into a three-dimensional measurement report from said calibration data.

2. A method as defined in claim 1, and cross-correlating optically said image of reflected light with a stored reference pattern; and enhancing said image in regions of sharp focus for detection by said light-sensitive detector array.

3. A method as defined in claim 1, and processing said image of reflected light by Fourier transforming said image, passing the Fourier transformed image through a transform filter for producing a transformed and filtered image, and then inverse transforming the transformed and filtered image; said processing step enhancing said image of reflected light in regions of sharp focus for detection by said light-sensitive detector array.

4. An arrangmeent for simultaneously obtaining three-dimensional measurements of at least two spatially separated points on objects which may be devoid of surface detail, comprising: projector means for projecting a pattern of light from a light source; lens means for imaging reflected light from said pattern in a narrow object plane; light-sensitive detector means for parallel detection of light in regions of the image; means for storing calibration data; means for adjusting said object plane focal distance with said lens means to intersect the surface of an object to be measured at an intersection; said intersection containing at last two spatially separated points; and means for reporting three-dimensional meaurements from said calibration data for each detected element indicating a light level above a threshold.

5. An arrangement as defined in claim 4, including a liquid crystal light valve with input and output, said image of reflected light being imaged onto said liquid crystal light valve input; a reference light pattern of collimated monochromatic light being projected onto said output of said liquid crystal light value; analyzer means selectively transmitting signals corresponding to coincidence of said image and said reference pattern for producing an enhanced image; said enhanced image passing on to said parallel detection means.

6. An arrangement as defined in claim 4, including a liquid crystal light valve for converting said image of reflected light to an image of collimated monochromatic light; means for Fourier transforming said monochromatic image; a transform filter for passing the Fourier transformed image therethrough to produce a transformed and filtered image, and means for inverse transforming the transformed and filtered image thereafter for enhancing said image of reflected light in regions of sharp focus detection by said parallel detection means.

* * * * *